United States Patent
Yang et al.

(10) Patent No.: US 11,635,180 B2
(45) Date of Patent: Apr. 25, 2023

(54) LOW GLARE WALL WASH LIGHT FIXTURE

(71) Applicant: USAI, LLC, New Windsor, NY (US)

(72) Inventors: Yi Yang, New Windsor, NY (US); Robert Leiter, New York, NY (US)

(*) Notice: Subject to any disclaimer, the term of this patent is extended or adjusted under 35 U.S.C. 154(b) by 0 days.

(21) Appl. No.: 17/845,772

(22) Filed: Jun. 21, 2022

(65) Prior Publication Data
US 2022/0403991 A1    Dec. 22, 2022

Related U.S. Application Data

(60) Provisional application No. 63/212,984, filed on Jun. 21, 2021.

(51) Int. Cl.
| | | |
|---|---|---|
| *F21S 8/02* | (2006.01) | |
| *F21V 13/04* | (2006.01) | |
| *F21V 7/04* | (2006.01) | |
| *G02B 27/30* | (2006.01) | |
| *F21V 3/04* | (2018.01) | |
| *F21V 5/04* | (2006.01) | |
| *F21Y 115/10* | (2016.01) | |

(52) U.S. Cl.
CPC ............. *F21S 8/026* (2013.01); *F21V 3/049* (2013.01); *F21V 5/04* (2013.01); *F21V 7/043* (2013.01); *F21V 13/04* (2013.01); *G02B 27/30* (2013.01); *F21Y 2115/10* (2016.08)

(58) Field of Classification Search
CPC .. F21S 8/026; F21V 3/049; F21V 5/04; F21V 7/043; F21V 13/04; G02B 27/30
See application file for complete search history.

(56) References Cited

U.S. PATENT DOCUMENTS

| | | | |
|---|---|---|---|
| 10,190,736 B1* | 1/2019 | Pyshos | F21V 7/0091 |
| 10,359,162 B2* | 7/2019 | Terumichi | F21V 7/08 |
| 2018/0356049 A1* | 12/2018 | Goelz | F21V 7/0025 |
| 2019/0120449 A1* | 4/2019 | Jones | F21V 21/041 |
| 2019/0162388 A1* | 5/2019 | Franck | F21S 8/026 |

* cited by examiner

*Primary Examiner* — Oluseye Iwarere
*Assistant Examiner* — Michael Chiang
(74) *Attorney, Agent, or Firm* — St. Onge Steward Johnston & Reens LLC

(57) ABSTRACT

A wall wash recessed light fixture has an enclosure, an aperture, an LED module, a tubular reflector, a lens, a trim element and a diffuser. The lens is disposed at an opening of the tubular reflector, has a concave surface facing the LED module and a convex surface facing the aperture, and has a principal axis aligned at an oblique angle $\Theta_1$ relative to an optical axis of the LED module. An internal kicker reflector is offset from the optical axis of the LED module toward a second end of the light fixture, and is substantially parallel to a height axis (Z) and lateral axis (X) and faces a center axis of the aperture and. The trim element is disposed below the collimator assembly and at least partially in the opening of the ceiling. A first diffuser covers a first trim opening and is aligned at an oblique angle relative to the longitudinal axis (X).

13 Claims, 16 Drawing Sheets

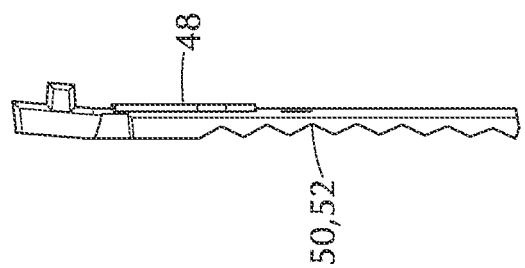
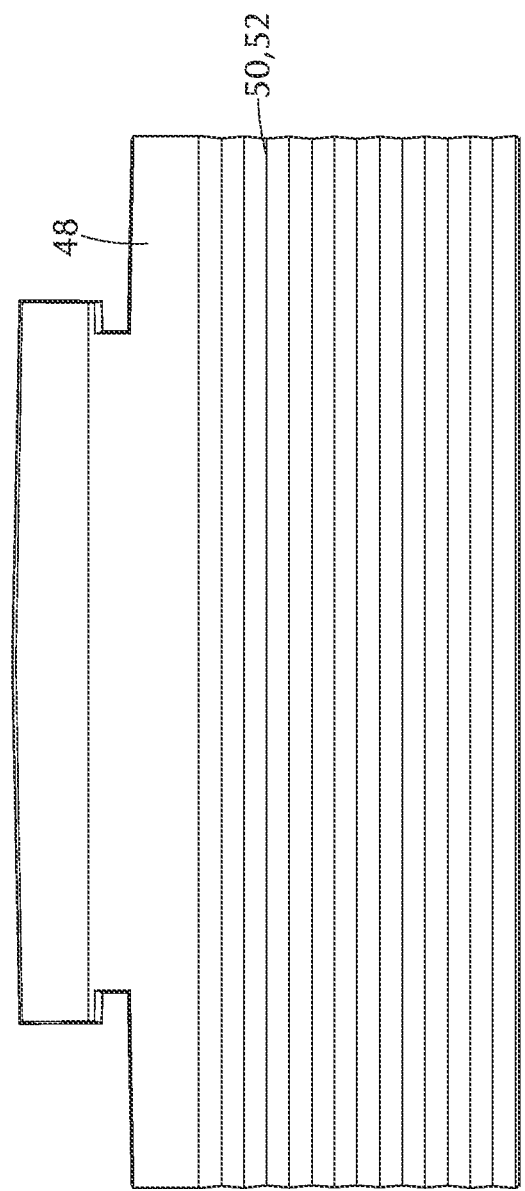

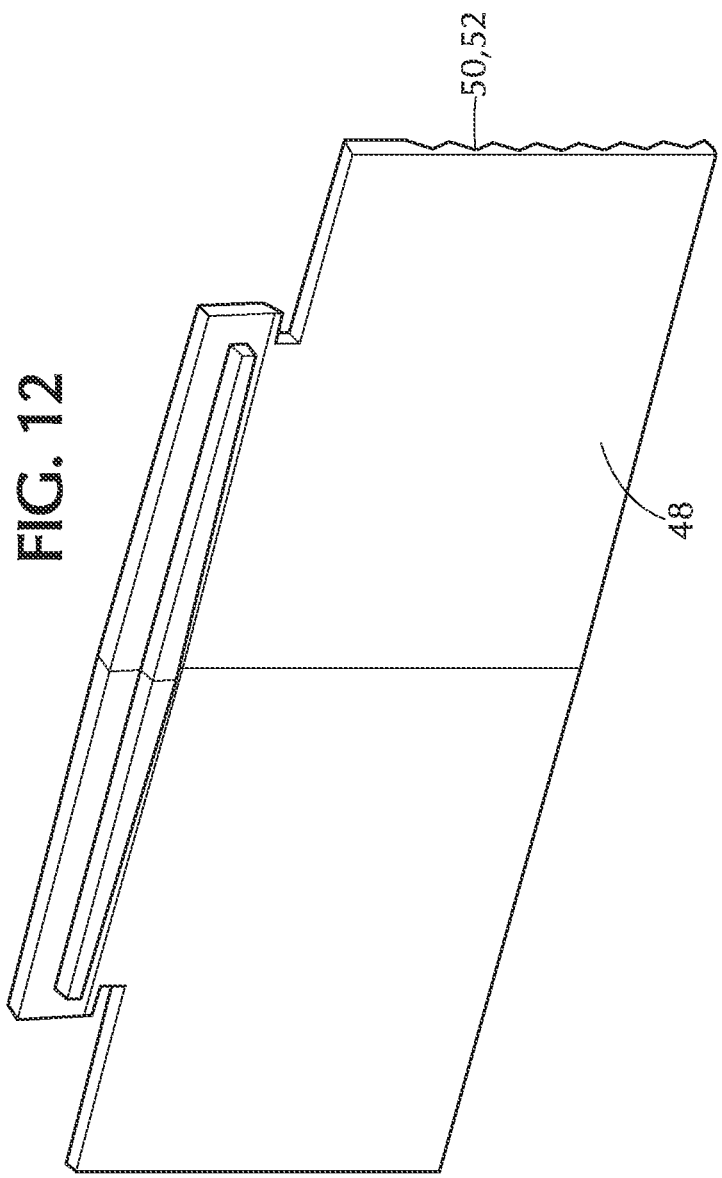

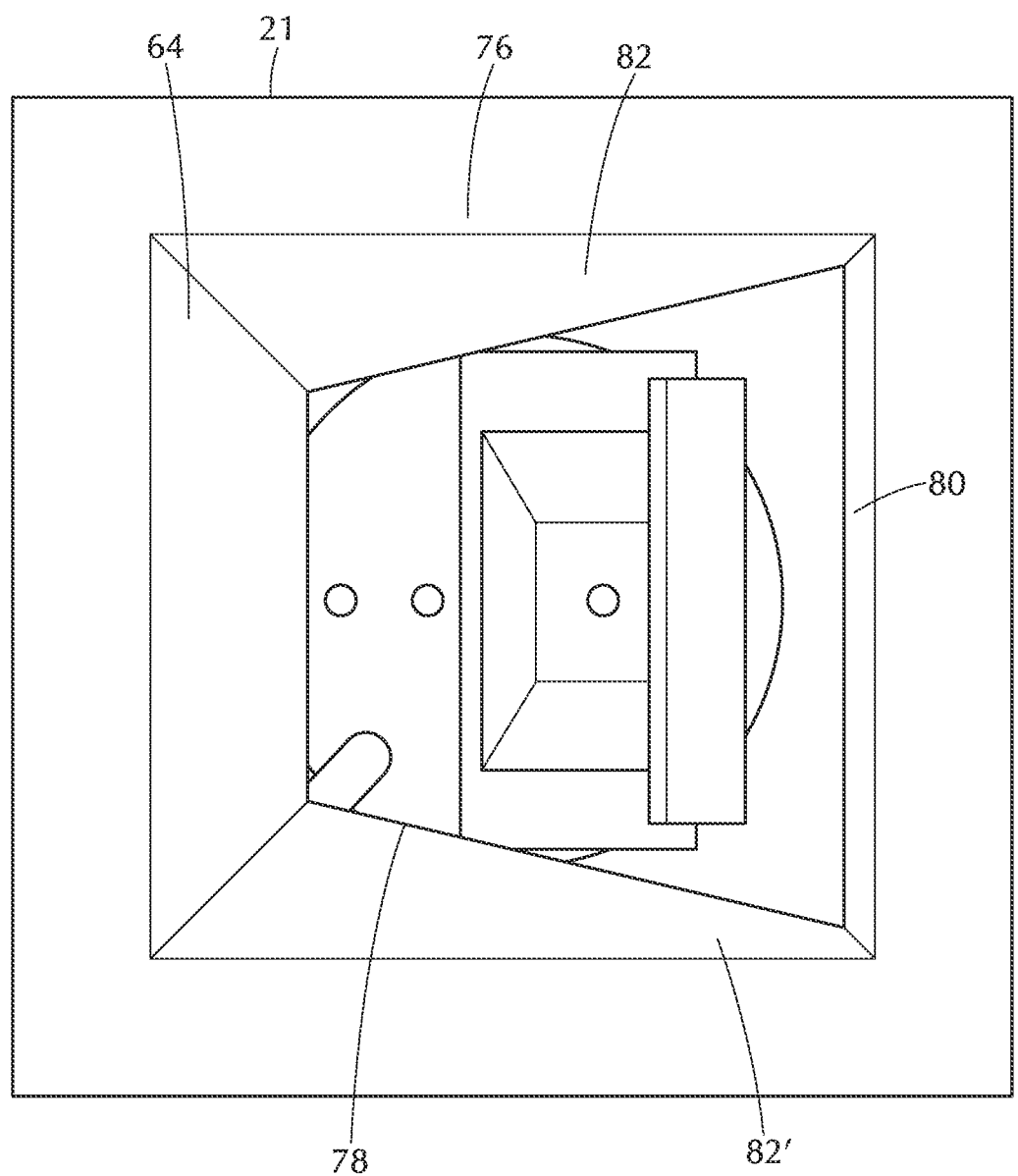

LOW GLARE WALL WASH LIGHT FIXTURE

FIELD OF THE INVENTION

The invention pertains to the field of lighting fixtures, and in particular, recessed wall wash lighting fixtures.

BACKGROUND OF THE INVENTION

A purpose of wall wash light fixture is to illuminate a typically vertical wall with a fixture installed in a typically horizontal ceiling. Often wall wash light fixtures are recessed within a ceiling such that all or a majority of the components of the light fixture are at or above the lower surface of the ceiling.

General desired performance characteristics for wall wash light fixtures include: light uniformity on the wall, with maximum to minimum brightness ratio of about 4:1, minimal glare in the directions perpendicular and parallel to the wall, an absence of dark bands across the top of the wall, an absence of "scalloping" on the wall between adjacent, spaced-apart wall wash fixtures, and an absence of color separation on the wall. Known wall wash fixtures do not meet all of these desired characteristics.

Other specific desired characteristics include a small form factor and aperture size, and a minimally intrusive or visible reflector below the ceiling level. The wall wash light fixture disclosed herein meets all of the above general and specific desired characteristics.

SUMMARY OF THE INVENTION

The wall wash recessed light fixture of the present design provides the aforementioned desired performance characteristics including light uniformity on the wall, minimal glare, an absence of dark bands at the top of the wall and an absence of light "scalloping." is provided to allow for removal and replacement of active components of the light fixture through a small opening in the ceiling having a minimal clearance with such components, without altering or damaging the ceiling and without the use of a large diameter trim. The present design provides such performance characteristics while having a small form factor and small aperture size, and having a minimally intrusive, non-visible reflector above ceiling level.

The inventive wall wash recessed light fixture configured according to the present design is operable to emit light through an opening in a ceiling toward a wall adjacent to the opening. The light fixture has an enclosure having a bottom wall and an aperture, and the aperture has a center axis passing through a center of the aperture and substantially perpendicular to a plane of the aperture and substantially parallel to a (typically vertical) height axis (Z) of the fixture.

An LED module is operable to emit light through the aperture and has an optical axis passing through the aperture and substantially parallel to the height axis (Z). The optical axis is substantially offset from the center axis of the aperture toward a second end of the light fixture farthest from the wall to be illuminated.

The light fixture has a collimator assembly having a tubular reflector and a lens. The tubular reflector has a first end disposed around the LED module and a second end with an opening, and is operable to direct substantially all of the light emitted from the LED module toward the opening of the tubular reflector.

The lens is disposed at the opening of the tubular reflector, and has a concave surface facing the LED module and a convex surface facing the aperture. The lens having a principal axis aligned at a first oblique angle $\theta_1$ relative to the optical axis of the LED module.

An internal kicker reflector has a reflective surface disposed substantially parallel to the height axis (Z). The reflective surface faces the enter axis of the aperture and is substantially offset from the optical axis of the LED module toward the second end of the light fixture.

A trim element having is operable to be disposed below the collimator assembly and at least partially in the opening of the ceiling.

A first diffuser covers a first opening of the trim element and aligned at a second oblique angle relative to the longitudinal axis (X), which can be equal to the first oblique angle $\Theta_1$.

BRIEF DESCRIPTION OF THE DRAWINGS

FIG. 10 is a front elevation view of the kicker reflector of the light fixture of FIG. 1

FIG. 11 is a side elevation view of the kicker reflector of FIG. 10.

FIG. 12 is a perspective view, from the rear, of the kicker reflector of FIG. 10.

FIG. 19 is a bottom view of the trim element of the inventive light fixture.

DETAILED DESCRIPTION OF THE INVENTION

Figure 1:
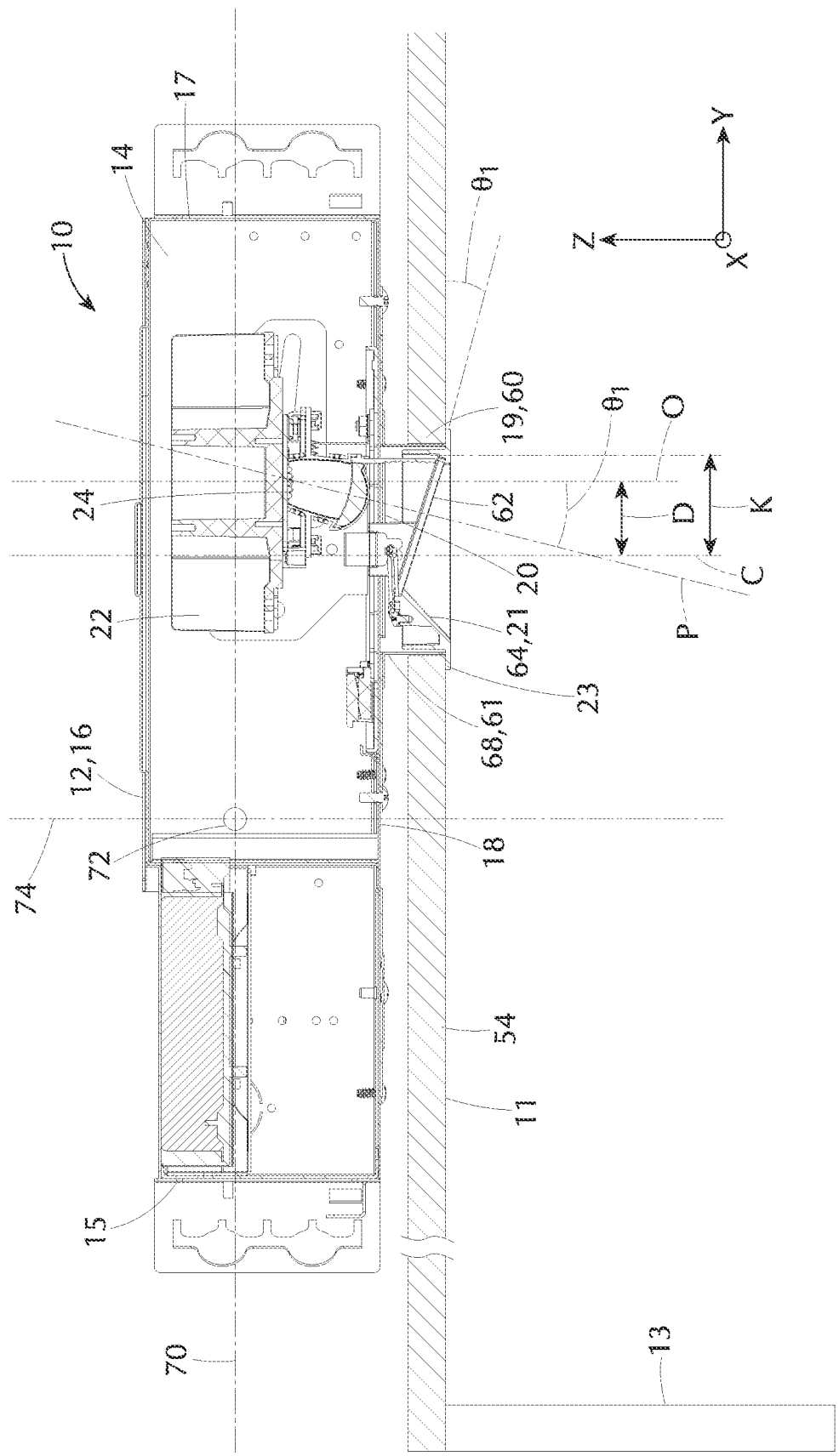
FIG. 1 is a cross sectional side elevation view of a first preferred embodiment of the inventive light fixture.

Referring to FIGS. 1-12 a first preferred embodiment of the low glare wall wash light fixture 10 is configured to emit light through an opening 19 in a ceiling 11. The light fixture 10 can have an enclosure 12 with a pair of opposed side walls 14, a pair of opposed end walls 15, 17, a top 16, and a bottom wall 18 with an aperture 20 therethrough. The enclosure 12 can also in include a collar 68 which surrounds the aperture 20 and depends downwardly from the bottom wall 18 into the opening 19 in the ceiling 11, preferably closely spaced from (e.g., lining) the edge of the ceiling 11 defining the opening 19.

Figure 2:
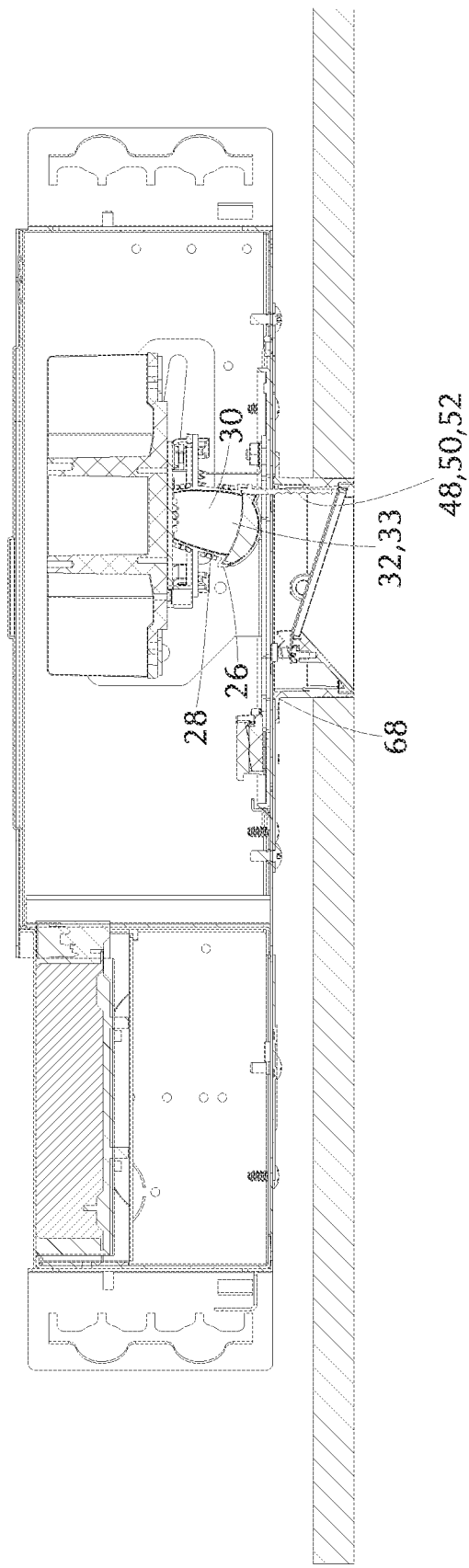
FIG. 2 is a cross sectional side elevation view of the light fixture of FIG. 1.

A removable trim element 21 can mount to the collar 68 and/or the bottom wall 18 of the enclosure 12. The trim element 21 can include an outwardly-extending flange 23 (FIG. 1) which surrounds the trim element 21 and extends beyond the edge of the ceiling 11 defining the opening 19, or can be flangeless (FIG. 2)

The enclosure 12 is adapted to be fastened to support structure (for example via hanger bars) above a typically horizontal ceiling 11 (such as plaster board), and remains above the ceiling. The light fixture is adapted and intended to be installed to emit light through the opening 19 in the ceiling 11 aligned with the aperture 20 and toward an adjacent wall 13 to be illuminated by the light fixture, such as a vertical wall.

The light fixture 10 can be oriented or aligned relative to mutually perpendicular axes (X,Y and Z). The light fixture 10 can have a longitudinal axis 70 parallel to the Y axis, a lateral axis 72 parallel to the X axis, and a height axis 74 parallel to the Z axis.

In a typical installation where the ceiling 11 is horizontal and the adjacent wall 13 is vertical, the X and Y axis (and longitudinal and lateral axes) are horizontal and the Z axis (and height axis) is vertical, and an X-Y plane is parallel to a plane of the ceiling 11 and perpendicular to a plane of the adjacent wall 13, an X-Z plane is parallel to the plane of the wall 13 and perpendicular to the plane of the ceiling 11, and a Y-Z plane is perpendicular to the planes of the ceiling 11 and wall 13.

The aperture 20 of the light fixture 10 can have an aperture plane parallel to the X-Y plane and can have a center axis C which substantially passes through a center of the aperture 20, perpendicular to the aperture plane and parallel to the height axis 74 of the light fixture.

The first end 15 of the light fixture 10 (a wall-facing end) is intended to be closest to the wall 13 to be illuminated and intermediate the aperture 20 and the adjacent wall 13, and the second end 17 is opposite the first end along the longitudinal axis 70 and is further from the wall, with the aperture 20 intermediate the second end 17 and the adjacent wall 13.

The light fixture 10 can include a heat sink 22 which can be disposed within the enclosure 12, above the aperture 20 and is operable to conduct heat away from a light source. The light source can be an LED module 24, having one or more LEDs, is disposed between the heat sink 22 and the aperture 20 and can be mounted or connected to the heat sink 22. The LEDs can be of a single color or multiple colors and can be, for example, a 6 mm or 12 mm chip-on-board (COB) LED, or several LEDs of various colors, and are operable to emit light through the aperture 20 and opening 19, and into the room below the light fixture.

The LED module has an optical axis O that passes through the aperture 20 and is preferably substantially parallel to the height axis 74 of the enclosure 12 and/or center axis C of the aperture 20. The LED module 24 is preferably aligned such that it is parallel to the X-Y axis and, in a typical installation in a horizontal ceiling, the LED module is horizontal such that it has a substantially vertical optical axis O.

The light fixture 10 preferably includes a collimator assembly 26 which is disposed between the LED module 24 and the aperture 20. The collimator assembly 26 is preferably removably attachable to the heat sink 22 or otherwise removably affixed relative to the enclosure 12, and is removable from, and installable in, the enclosure 12 through the opening 19 in the ceiling 11 and aperture 20, from within the room below the light fixture.

The collimator assembly 26 preferably has a lens 34 and a tubular reflector element 28 disposed between the lens and the LED module 24. The tubular reflector element 28 forms a light tube adapted to collimate and direct light emitted by the LED module 24. The tubular reflector element 28 can have an upper portion 30 attached to the heat sink 22 and surrounding the LEDs, and can have a lower portion 32 with an opening 33.

The tubular reflector element 28 is preferably operable to direct substantially all of the light emitted by the LED module toward the opening 33 of the tubular reflector element 28. The tubular reflector element 28 has an internal surface 39 which preferably has a white, highly reflective finish. For example, the tubular reflector element 28 can be formed from highly reflective white polycarbonate material. The tubular reflector element 28 can have a rectangular or semi-rectangular horizontal cross section, or another suitable cross sectional shape. The tubular reflector element 28 is preferably aligned at an oblique angle relative to the optical axis O, toward the first end 15 of the light fixture.

The lens 34 of the collimator assembly 26 is preferably connected to the lower end 32 of the tubular reflector element 28. The lens 34 is configured to direct light emitted by the LED module 24 toward the adjacent wall 13 to be illuminated. In general, the function of the lens 34 is to narrow and bend the light beam coming out of the tubular reflector element 28 of the collimator assembly 26. In particular, the lens is designed to bend and narrow the beam in one direction (vertically, along a height of the wall 13; Z direction) and expand the beam in the other direction (horizontally or laterally, along a length of the wall; X direction), to achieve the desired light distributions.

A majority of the lens 34 can be a complex, concave-convex lens, with a concave side 36 facing upward toward the LED module 24 and a convex side 38 facing downward, for example toward the aperture 20 and/or opening 19 in the ceiling 11. The lens 34 can have first and second ends 40, 42 which are tapered relative to a central portion 44, and can also include a flared tail portion 46 extending from the second end 42 thereof toward the second end 17 of the light fixture. The lens 34 preferably has an extruded shape such that it has a constant, or substantially constant cross-section in a lateral direction (X) parallel to the length of the wall 13 to be illuminated, such that it is symmetrical or substantially symmetrical about a central plane of the lens 34 parallel to the Y-Z plane. The surfaces of the concave and convex sides 36, 38 of the lens 34 can be partially cylindrical.

The lens 34 can be an integral (i.e., one-piece) unit or can be a composite structure having two separate lenses. The lens material can be UV stabilized polycarbonate that will avoid yellowing under strong LED light in high temperature and high humidity environment.

The lens 34 is preferably tilted at an oblique angle about an axis parallel to the lateral axis (X), relative to the optical axis O, toward the first end 15 of the light fixture and the wall 13 to be illuminated. For example, the lens 34 (or the concave-convex portion thereof) can have a principal axis P aligned at an oblique angle $\Theta_1$ (for example, 10-20 degrees, or another acute angle) relative to the (typically vertical) optical axis O of the LED module 24.

Figure 7:
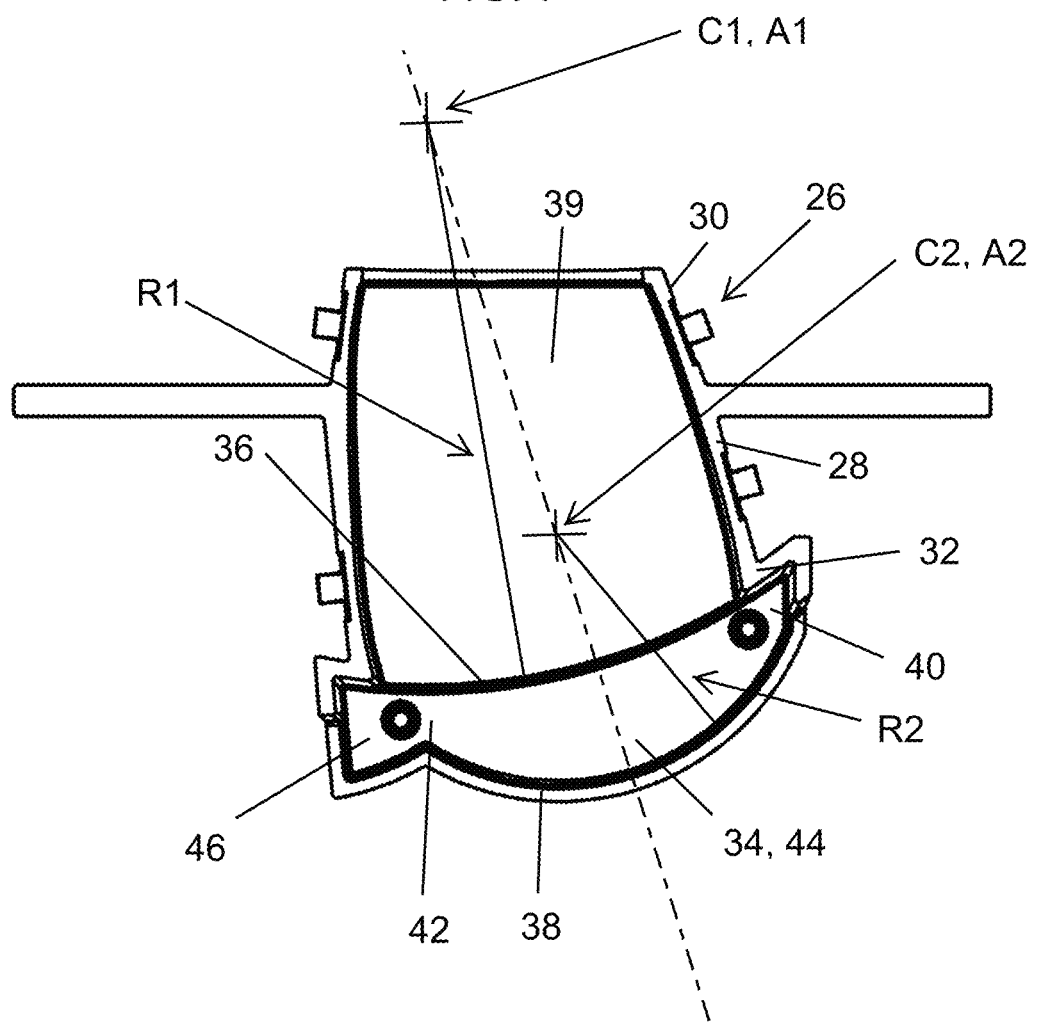
FIG. 7 is a cross sectional side elevation view of the collimator assembly of FIG. 5.
Figure 8:
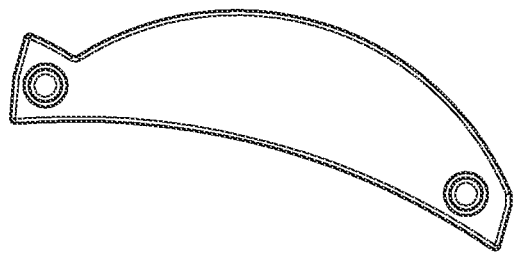
FIG. 8 is a side elevation view (inverted) of the lens of the light fixture of FIG. 1.
Figure 9:
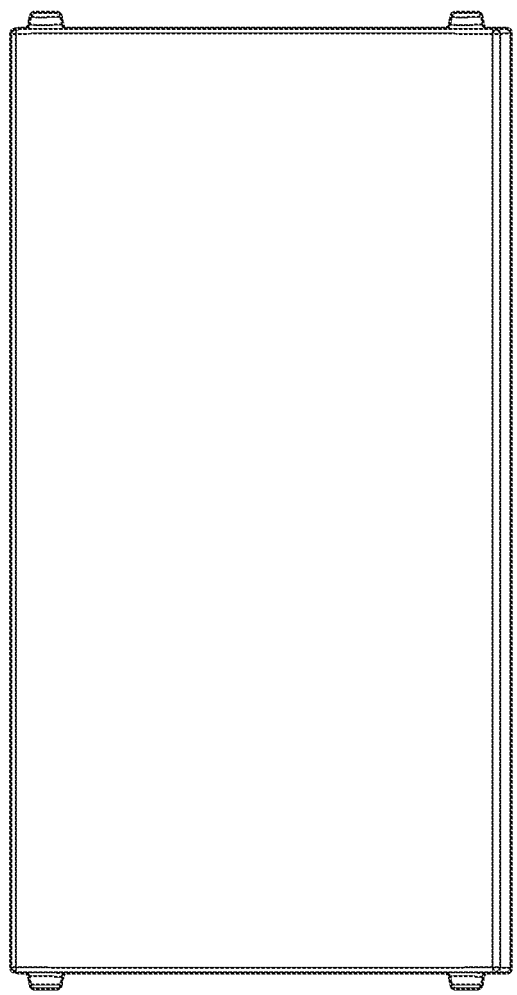
FIG. 9 is a bottom view of the lens of FIG. 8.

As depicted in FIG. 7, a radius of curvature $R_1$ of the concave side 36 of the lens 34 can be substantially greater than a radius of curvature $R_2$ of the convex side 38. As an example, the concave side 36 of the lens 34 can have a curvature radius of about 1.575 in, and the convex side 38 can have a curvature radius of about 0.630 in.

The concave and convex sides of the lens 34 have centers of curvature, which can also be considered axes of curvature due to the aforementioned semi-cylindrical shapes thereof. A first center of curvature $C_1$ and a first axis of curvature $A_1$ of the concave side 36 of the lens 34 can be disposed above the LED module 24 and outside the tubular reflector element 28 (e.g., such that the LED module is intermediate the first center of curvature $C_1$ and the lens), and a second center of curvature $C_2$ and a second axis of curvature $A_2$ of the convex side 38 can be disposed below the LED module 24 and within the tubular reflector element 28 (e.g., such that the second center of curvature $C_2$ is intermediate the LED module and the lens). The axes of curvature $A_1$, $A_2$ are preferably parallel to the lateral axis 72 (X axis) of the light fixture and perpendicular to the optical axis O, and in use are preferably typically horizontal and parallel to the length of the adjacent wall 13.

The lower portion 32 of the tubular reflector element 28 is preferably sized and shaped to closely surround the lens 34, such that all or substantially all of the light exiting the tubular reflector element 28 passes through the lens 34.

The LED module 24, and the optical axis O thereof, are preferably substantially offset in a direction toward the second end 17 of the light fixture (i.e., parallel the longitudinal axis 70 of the light fixture, or Y-axis, away from the wall-facing first side 15 of the light fixture), relative to the center axis C of the aperture 20, by a distance D, to maximize the wall-wash light emitted from the light fixture. For example, the optical axis O of the LED module 24 can be off-set from the center axis C of the aperture 20 by about 30-40% of a longitudinal (Y-axis) width of the aperture 20.

In a typical operation in a horizontal ceiling 11, the light fixture 10 is installed in an orientation such that both the center axis C and the optical axis O are parallel and are vertical or substantially vertical (or otherwise perpendicular to the ceiling 11 or other structure in which the light fixture is mounted). However, other installed orientations of the light fixture are possible.

The light fixture 10 can have an internal kicker reflector 48 which is preferably disposed below and adjacent to the lens 34. The kicker reflector 48 extends downwardly from adjacent the lower portion 46 of the tubular reflector element 28 of the collimator assembly 26. Kicker reflector 48 has a reflective surface 50 which is generally vertical (i.e., parallel to the optical axis O) and parallel to the X-Z plane and faces the center axis C of the aperture 20 and optical axis O. The kicker reflector 48 is configured to reflect light emitted from the LED module 24 and passing through the collimator assembly 26 and aperture 20, and incident on the reflective surface 50, generally toward the adjacent wall 13 to be illuminated. A particular function of the kicker reflector 48 is to direct light toward a top portion of the adjacent wall 13 (e.g., a portion of the wall adjacent the ceiling).

Figure 3:
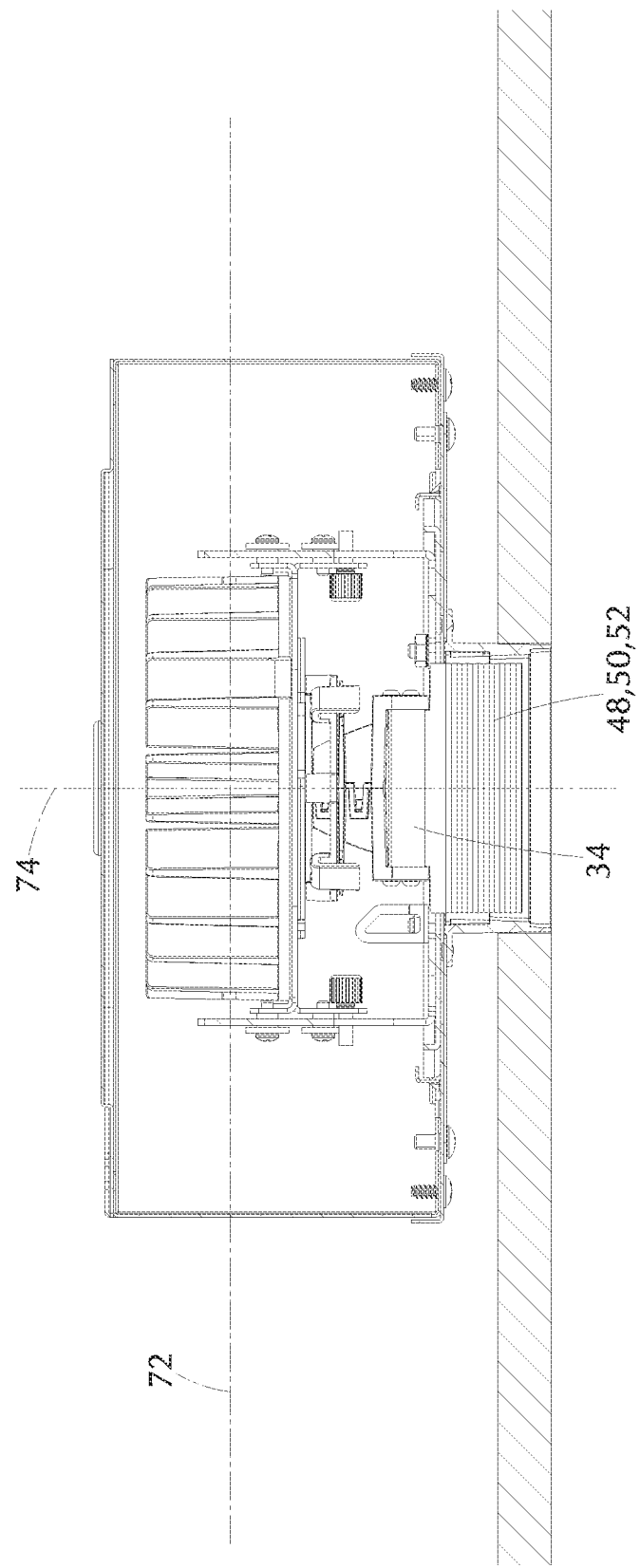
FIG. 3 is cross sectional end elevation view of the light fixture of FIG. 1.
Figure 4:
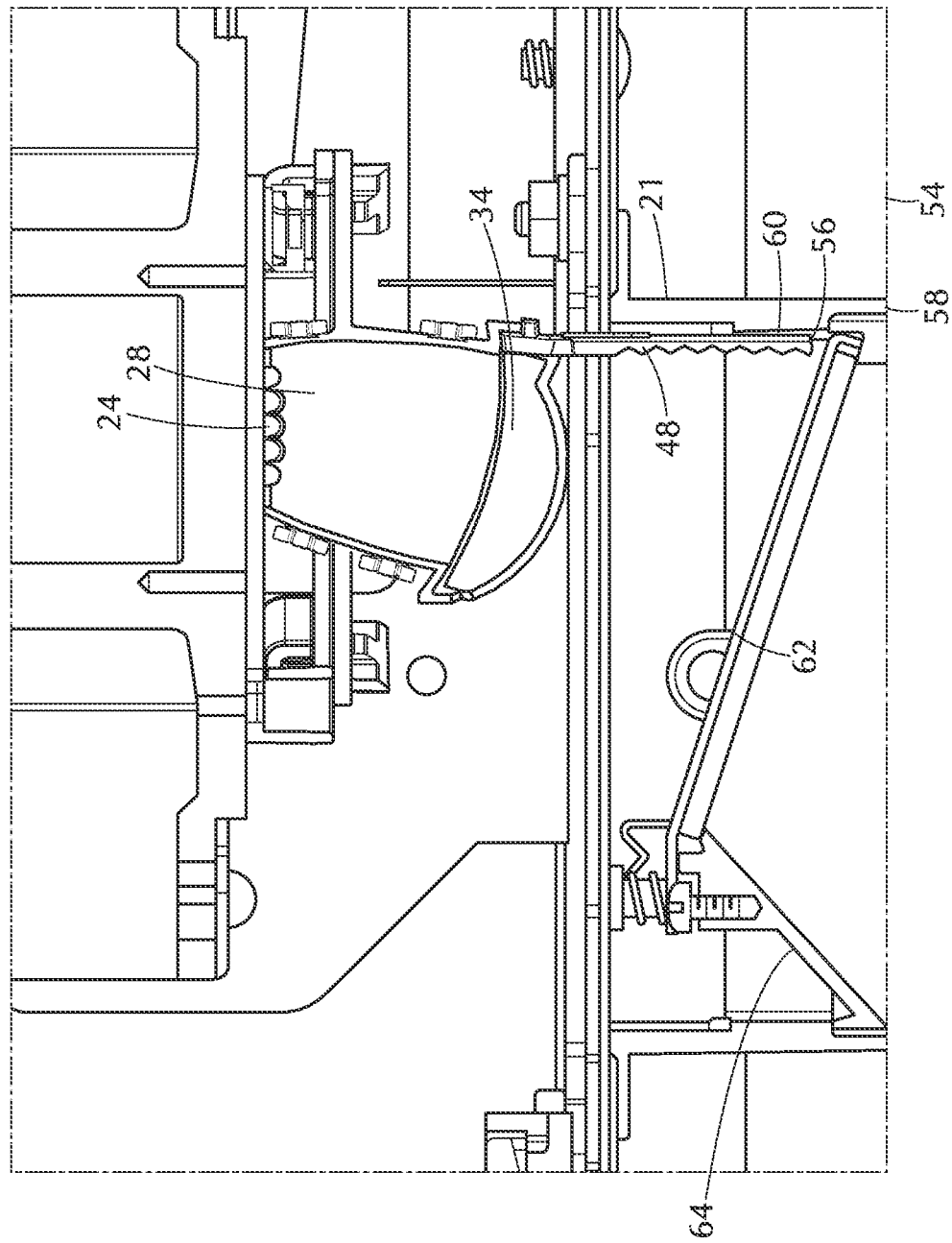
FIG. 4 is a partial cross sectional side elevation view of the light fixture of FIG. 1.
Figure 5:
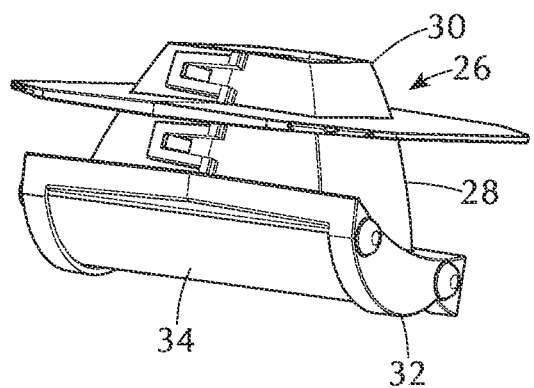
FIG. 5 is a perspective view of a collimator assembly of the light fixture of FIG. 1.
Figure 6:
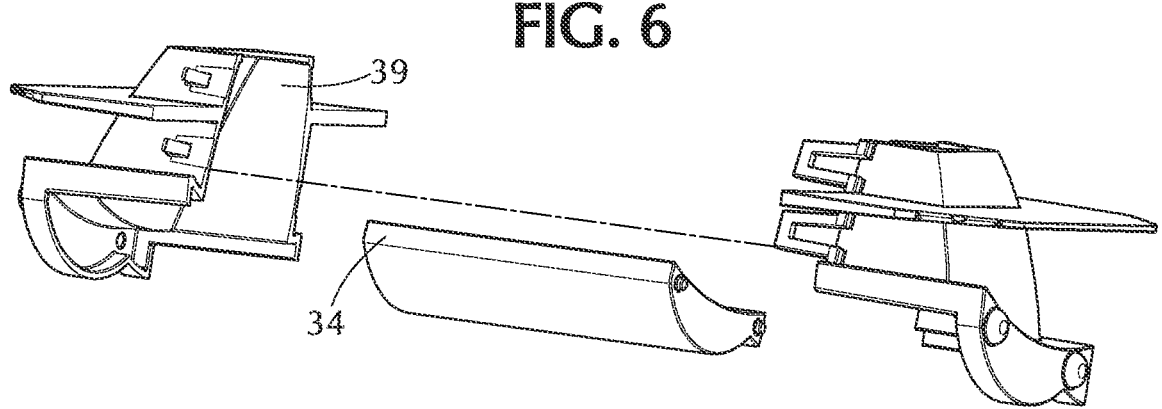
FIG. 6 is an exploded view of the collimator assembly of FIG. 5.

The reflective surface 50 of the kicker reflector 48 can have a plurality of prismatic features 52 which extend laterally (X axis) along a length thereof, forming an angularly corrugated reflective surface. The prismatic features 52 can be substantially identical, and substantially evenly vertically-spaced (Z axis), and tend to reflect light horizontally to direct light toward the top portion of the adjacent wall 13. A lateral length (X axis) of the reflective surface 50 is preferably greater than a corresponding lateral length of the lens 34, for example 50-75% greater (FIG. 3).

The kicker reflector 48 is internal to the light fixture 10 and is configured to be positioned above a bottom plane or surface 54 of the ceiling 11 such that it is preferably not directly visible from within the room below. A bottom 56 of the kicker reflector 48 is disposed at or above a vertical position of a bottom 58 of the collar 68. Preferably, the kicker reflector is disposed adjacent a far side 60 of the collar 68 furthest away from the first end 15 of the light fixture 10 (and thus furthest away from the wall 13 in use) such that the kicker reflector 48 (and in particular the reflective surface 50 thereof) is offset from the center axis C and optical axis O toward the second end 17 of the light fixture, and such that the optical axis O is intermediate the center axis C and the reflective surface 50, and such that the reflective surface 50 is disposed between the optical axis O of the LED module 24 and the far side 60 of the trim element 21. For example, a longitudinal position of the kicker reflector 48 reflective surface 50 can be offset from the center axis C by a distance K which is greater than the offset D of the optical axis O.

It is beneficial to move the light engine and optical system as far away from the wall side and as close to the trim opening as possible. In this way, the entire trim opening can be taken advantage of.

The light fixture 10 can include a recessed diffuser 62 disposed below the lens 34 and above the bottom 58 of the collar 68 and/or above the bottom plan 54 of the ceiling 11. The recessed diffuser 62 can be substantially planar and can be disposed at an oblique angle relative to the longitudinal axis 70 of the light fixture (e.g., Y axis), and inclined toward the first end 15 of the light fixture. For example, the recessed diffuser 62 can be disposed at an angle equal or substantially equal to the aforementioned angle $\Theta_1$, relative to horizontal.

The trim element 21 can include a front bevel 64 configured to minimize glare. The front bevel 64 is preferably disposed between the diffuser 62 and the first end 15 of the light fixture 10 and is inclined toward the second end 17 of the light fixture. A top edge of the front bevel 64 preferably abuts a lower surface of the recessed diffuser 62 and the front bevel extends downwardly therefrom toward a near side 61 of the collar 68, closest to the first end 15 of the light fixture 10. The trim element 21 preferably includes a plurality of bevels, all of which are angled upwardly from a bottom opening 76 of the trim element 21 to a top opening 78 of the trim element 21. For example, the trim element 21 can include a rear bevel 80 (FIG. 19) which is opposed to the front bevel 64, and a pair of opposed side bevels 82, 82'.

Downward (room) facing surfaces of the front, rear and side bevels of the trim element 21 can have a black or dark specular finish to reduce glare. Top edges of the front, rear and side bevels can form the top opening 78 of the trim element 21, which can have a trapezoidal shape, such as in the case of a square (or rectilinear) trim element 21 for a corresponding ceiling opening 19. Bottom portions of the bevels can form the bottom opening 76 of the trim element 21, which can have a square shape. The recessed diffuser 62 preferably covers the top opening 78 such that all light emitted from the light fixture 10 passes through the recessed diffuser 62.

Figure 13:
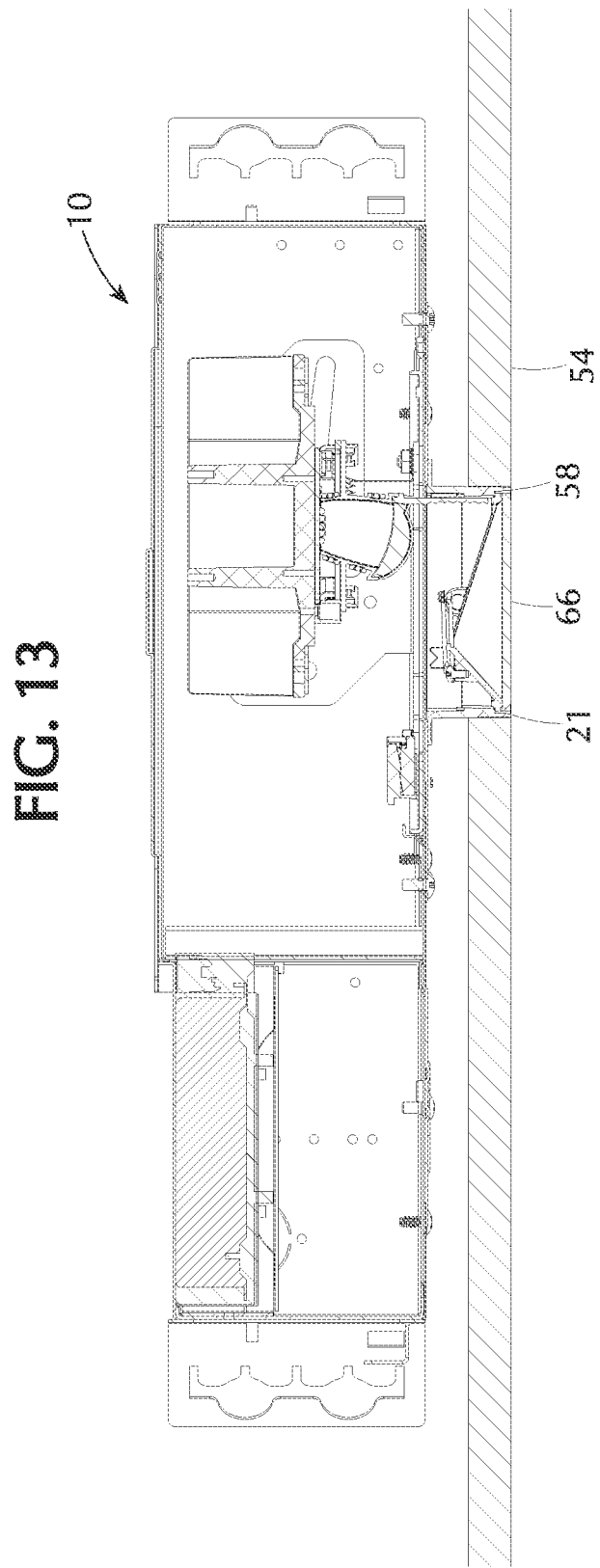
FIG. 13 is a cross sectional side elevation view of a second preferred embodiment of the inventive light fixture.
Figure 14:
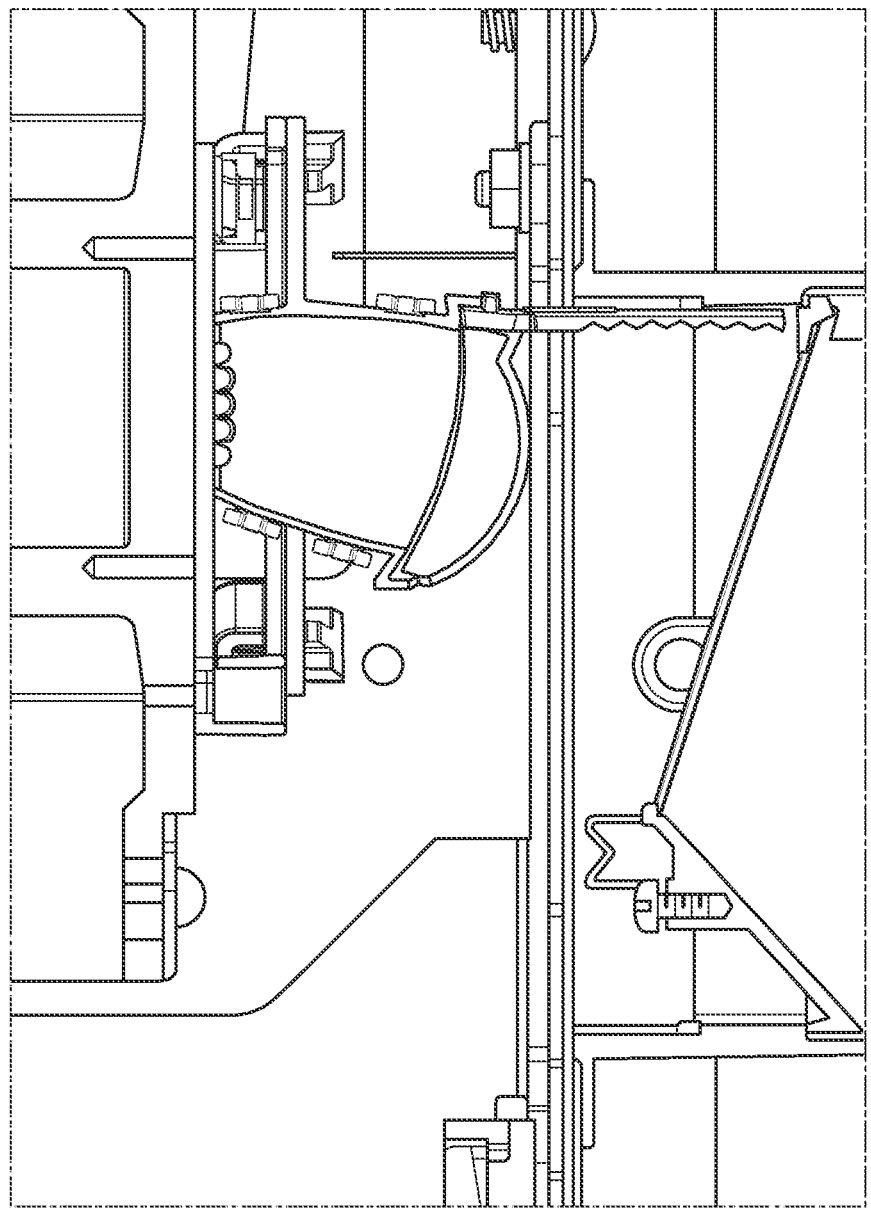
FIG. 14 is a partial cross sectional side elevation view of the light fixture of FIG. 13.

Referring to FIGS. 13 and 14, in a second preferred embodiment similar to the first embodiment, the light fixture 10 can include a second, flush diffuser 66 which is disposed below the recessed diffuser 62 and can be substantially flush with the bottom 58 of the collar 68 and/or the bottom surface 54 of the ceiling 11. The flush diffuser 66 can be a solite lens or another suitable diffuser. In this configuration, the recessed diffuser 62 is not directly visible from within the room, which can reduce glare. In addition, the second diffuser 66 is operable to direct additional light toward a top portion of the adjacent wall 13 to reduce gray/dark bands thereon and to reduce light scalloping (i.e., light intensity variation) along the length of the wall 13.

Figure 15:
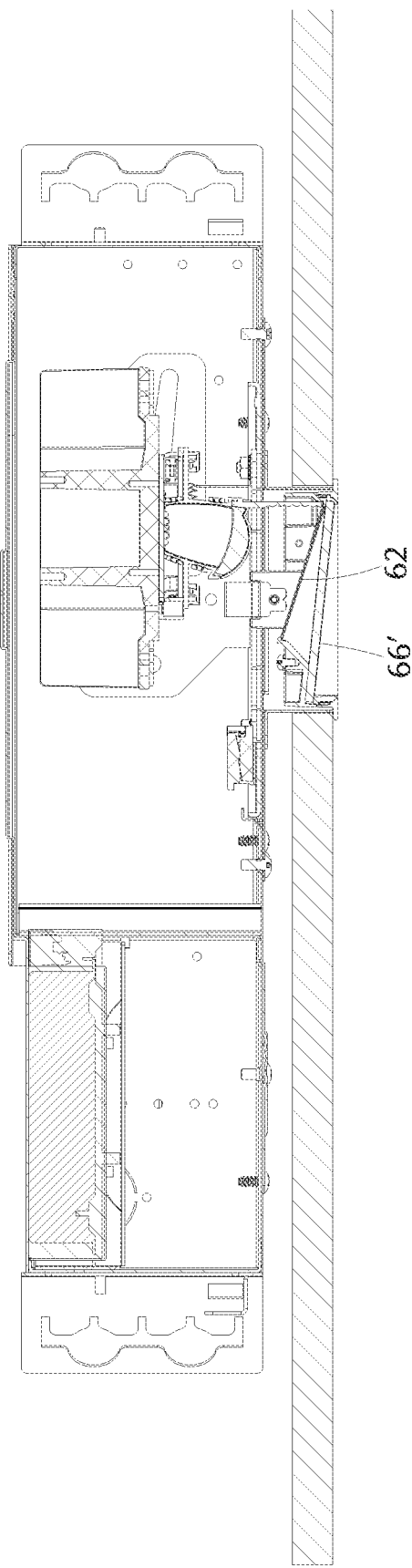
FIG. 15 is a cross sectional side elevation view of a third preferred embodiment of the inventive light fixture.

Referring to FIG. 15, in a third preferred embodiment similar to the second embodiment, the second diffuser 66' can be aligned similar to the recessed diffuser 62 but at a second oblique angle (for example, an acute angle) relative to the longitudinal axis 70 (Y axis). The second oblique angle is preferably less than the aforementioned angle $\Theta_1$ at which recessed diffuser 62 is aligned. However, the second oblique angle can be equal to or greater than such angle $\theta_1$.

Figure 16:
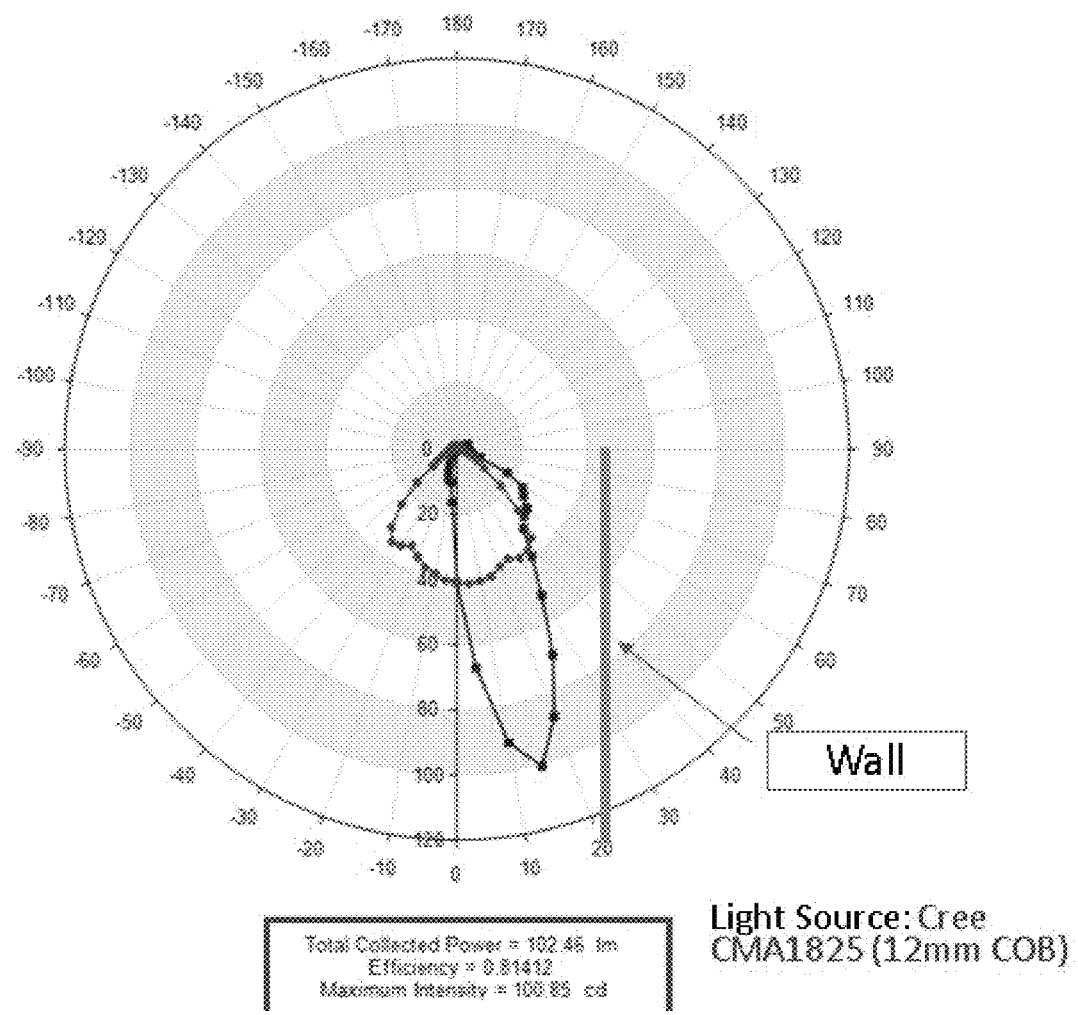
FIG. 16 is an exemplary light distribution curve for the inventive light fixture.
Figure 17:
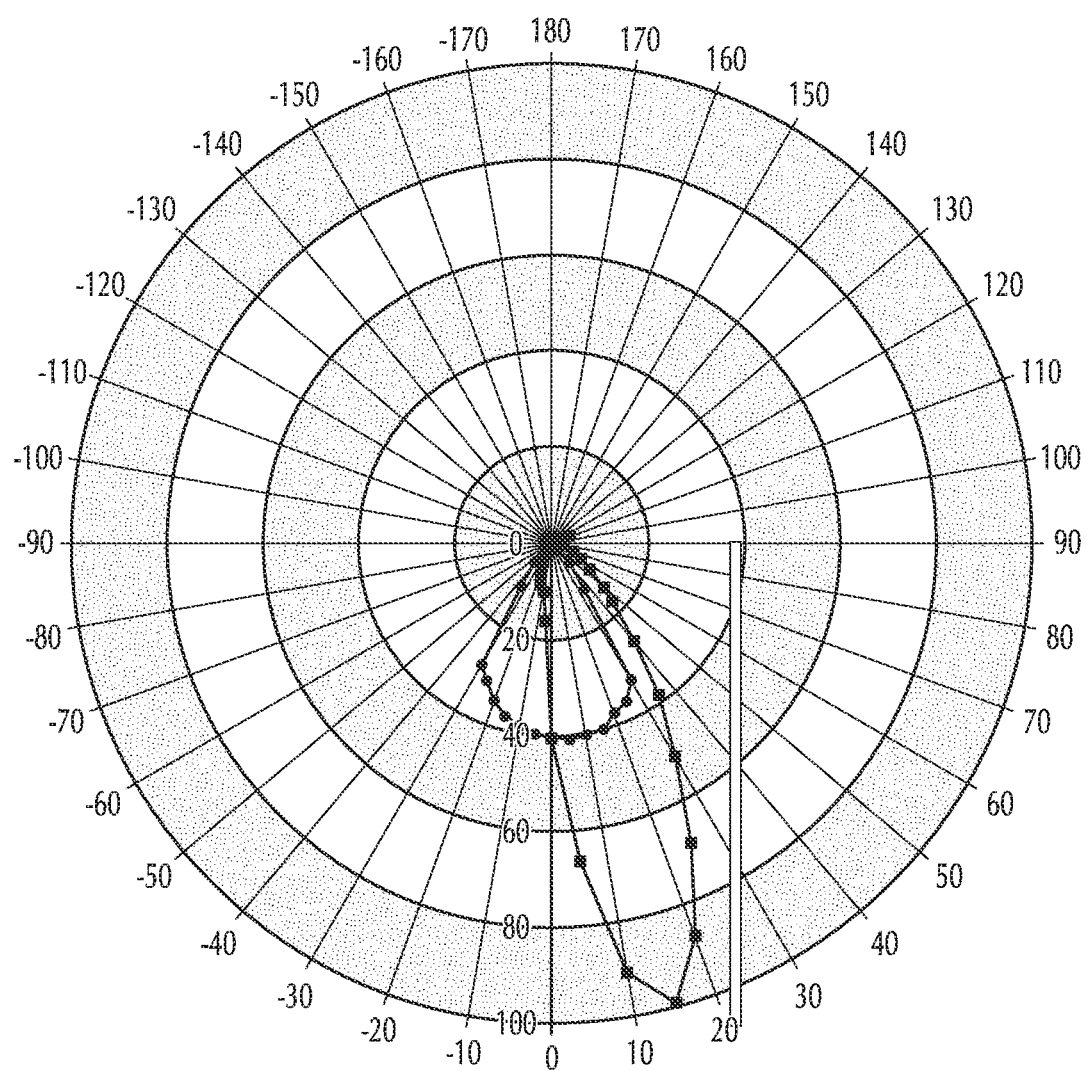
FIG. 17 is an exemplary light distribution curve for the inventive light fixture.

Referring to FIGS. 16 and 17, the configuration of the light fixture 10 provides superior light distribution for wallwash applications. The light distributions shown in FIGS. 16 and 17 are the types of distribution needed to achieve the desired general and specific performance in the wall wash lighting application, which is described above.

Figure 18:
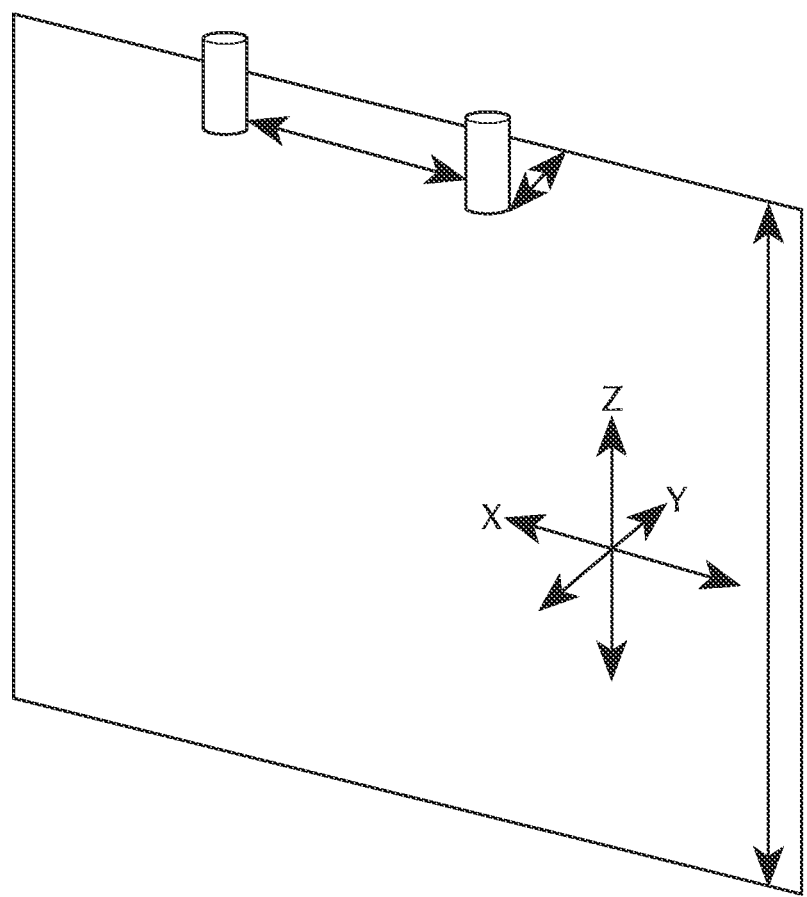
FIG. 18 is a schematic view of a preferred layout of the wall wash light fixtures in a room, adjacent a wall to be illuminated.

Referring to FIG. 18, usually the required setback and spacing requirements for wall wash lighting fixtures is proportional to the size of the aperture of the fixtures. For example, in a typical layout for wall wash fixtures for typical wall heights of, for example, 8-9 feet, a series of wall wash fixtures 10, 10' are installed in a ceiling at a set back distance (Y-axis) of for example 2-3 feet, and are spaced laterally, parallel to the wall (X-axis) at a distance of, for example 18 to 24 inches.

What is claimed:

1. A wall wash recessed light fixture operable to emit light through an opening in a ceiling toward a wall adjacent to the opening, the light fixture comprising:
    mutually perpendicular longitudinal (Y), lateral (X) and height (Z) axes;
    a first end and a second end opposite the first end along the longitudinal axis (Y), and a first side and a second side opposite the first side along the lateral axis (X);
    an enclosure having a bottom wall and an aperture in the bottom wall, and the aperture having a center axis passing through a center of the aperture and substantially perpendicular to a plane of the aperture and substantially parallel to the height axis (Z);
    an LED module operable to emit light through the aperture, the LED module having an optical axis passing through the aperture and substantially parallel to the height axis (Z), and the optical axis being substantially offset from the center axis of the aperture toward the second end of the light fixture;
    a collimator assembly having a tubular reflector and a lens;
    the tubular reflector having a first end disposed around the LED module and having a second end with an opening, and the tubular reflector being operable to direct substantially all of the light emitted from the LED module toward the opening of the tubular reflector;
    the lens being disposed at the opening of the tubular reflector, the lens having concave surface facing the LED module and a convex surface facing the aperture, and the lens having a principal axis aligned a first oblique angle $\Theta_1$ relative to the optical axis of the LED module;
    an internal kicker reflector having a reflective surface disposed substantially parallel to the height axis (Z), the reflective surface facing the center axis of the aperture and being substantially offset from the optical axis of the LED module toward the second end of the light fixture;
    a trim element operable to be disposed below the collimator assembly and at least partially in the opening of the ceiling, the trim element having a first trim opening; and
    a first diffuser covering the first trim opening, the first diffuser being aligned at a second oblique angle relative to the longitudinal axis (X).

2. A wall wash recessed light fixture as in claim 1, wherein:
    a radius of curvature $R_1$ of the concave side of the lens is substantially greater than a radius of curvature $R_2$ of the convex side.

3. A wall wash recessed light fixture as in claim 2, wherein:
    the concave side of the lens has a first center of curvature and the LED module is intermediate the first center of curvature and the lens, and the convex side of the lens has a second center of curvature and the second center of curvature is intermediate the LED module and the lens.

4. A wall wash recessed light fixture as in claim 3, wherein:
    the lens preferably has a substantially constant cross-section in the lateral axis (X) and is substantially symmetrical about a central plane of the lens parallel to an Y-Z plane.

5. A wall wash recessed light fixture as in claim 4, wherein:
    the concave and convex sides of the lens are partially cylindrical.

6. A wall wash recessed light fixture as in claim 1, wherein:
    the reflective surface of the kicker reflector has a plurality of prismatic features which extend laterally (X axis) along a length of the reflective surface.

7. A wall wash recessed light fixture as in claim 6, wherein:
    the prismatic features of the reflective surface of the kicker reflector are substantially identical, and substantially evenly vertically-spaced (Z axis).

8. A wall wash recessed light fixture as in claim 7, wherein:
    a lateral length (X axis) of the prismatic features of the reflective surface of the kicker reflector is substantially greater than a corresponding lateral length of the lens.

9. A wall wash recessed light fixture as in claim 1, further comprising:
    a collar extending from the bottom wall of the enclosure and surrounding the aperture, and being configured to extend into the opening in the ceiling;
    the collar having a far side offset from the center axis of the aperture toward the second end of the light fixture, parallel the longitudinal axis (Y); and
    the kicker reflector being adjacent the far side of the collar.

10. A wall wash recessed light fixture as in claim 1, further comprising:
    the trim element having a second trim opening below the first trim opening; and
    a second diffuser being disposed below the first diffuser and covering the second trim opening.

11. A wall wash recessed light fixture as in claim 10, wherein:
    the second diffuser is configured to be substantially flush with a bottom surface of the ceiling.

12. A wall wash recessed light fixture as in claim 1, wherein:

the second oblique angle of the first diffuser is substantially equal to the first oblique angle $\Theta_1$ of the principal axis of the lens.

13. A wall wash recessed light fixture as in claim 1, further comprising:
the collimator assembly is removable from, and installable in, the enclosure through the aperture, from within a room below the light fixture.

\* \* \* \* \*